(No Model.) 2 Sheets—Sheet 1.
N. H. RAYMOND.
WATCHMAN'S ELECTRIC TIME RECORDER.
No. 483,308. Patented Sept. 27, 1892.
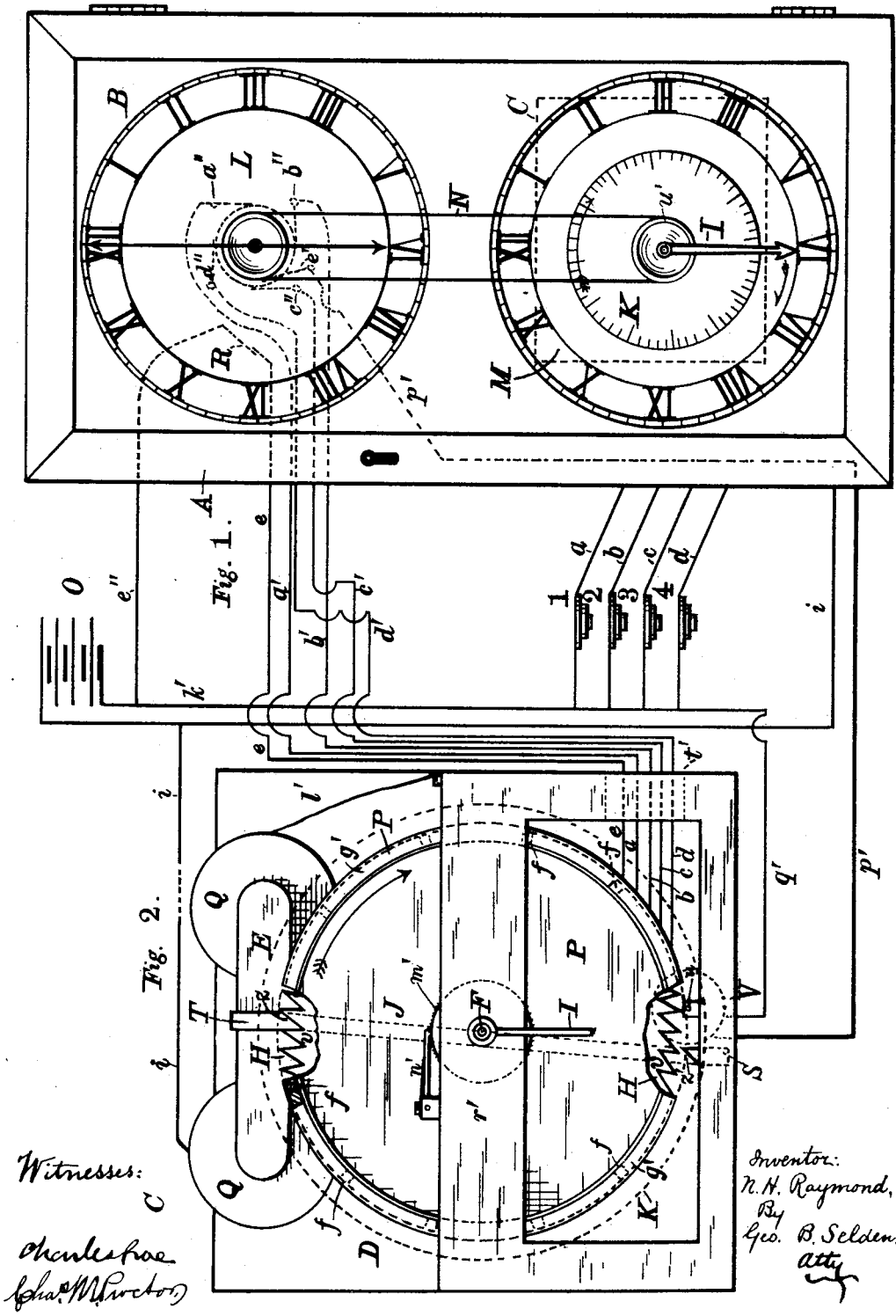
Witnesses:
Charles Roe
Chas. M. Procton
Inventor:
N. H. Raymond,
By Geo. B. Selden
atty

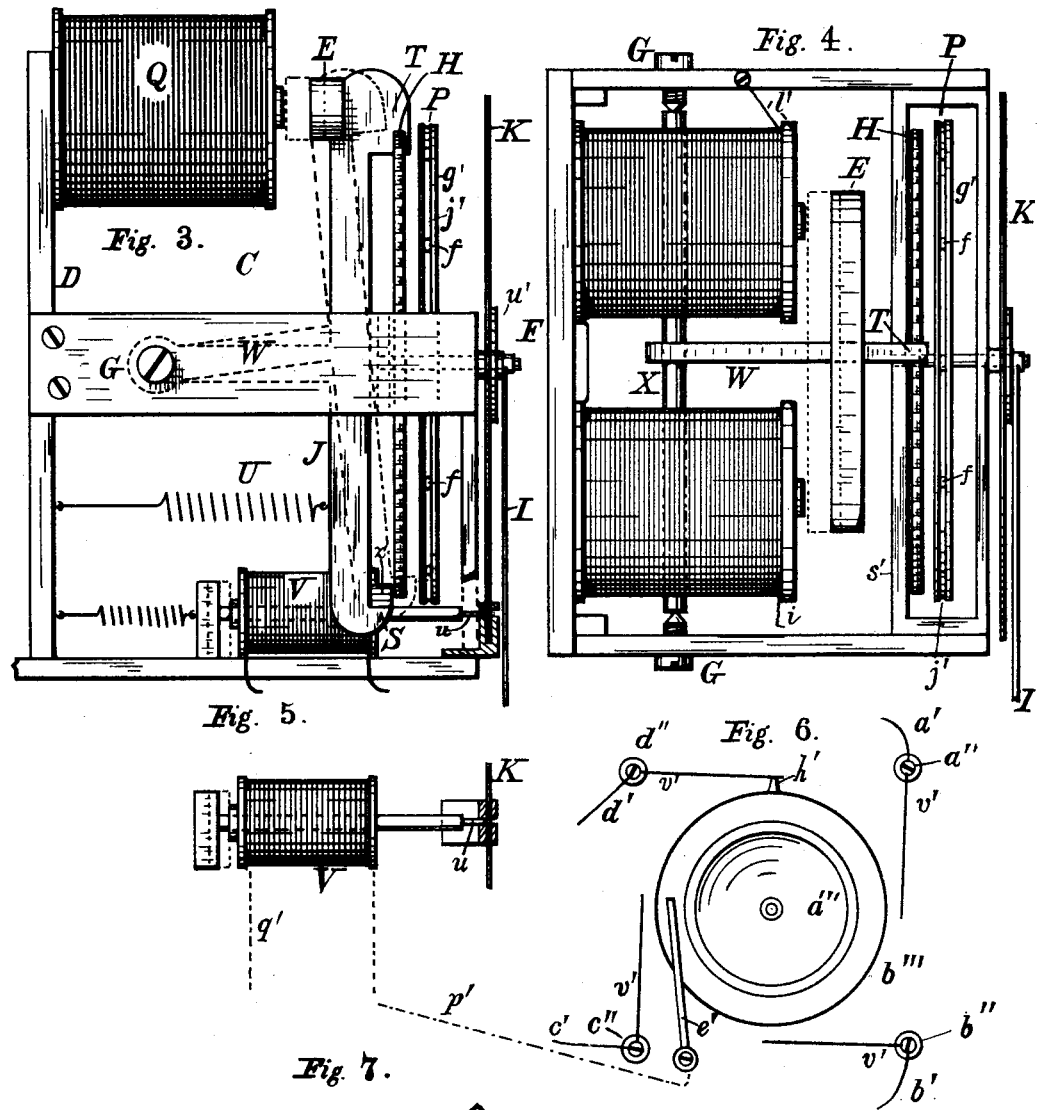

UNITED STATES PATENT OFFICE.

NELSON H. RAYMOND, OF BUFFALO, NEW YORK, ASSIGNOR OF ONE-HALF TO CHARLES M. PROCTOR, OF SAME PLACE.

WATCHMAN'S ELECTRIC TIME-RECORDER.

SPECIFICATION forming part of Letters Patent No. 483,308, dated September 27, 1892.

Application filed August 17, 1891. Serial No. 402,801. (No model.)

*To all whom it may concern:*

Be it known that I, NELSON H. RAYMOND, a citizen of the United States, residing at Buffalo, in the State of New York, have invented certain Improvements in Watchmen's Time-Recorders, of which the following is a specification, reference being had to the accompanying drawings.

My invention relates to improvements in electrical indicators designed principally for use as a watchman's recorder, but capable of being employed for other purposes.

My improvements are fully described and illustrated in the following specification and the accompanying drawings, the novel features thereof being specified in the claims annexed to the said specification.

In the accompanying drawings, representing my improvements in electrical indicators, Figure 1 is a front view of the apparatus inclosed in its case, showing also the electric circuits to the different stations. Fig. 2 is a front elevation of the electrical indicating and recording mechanism. Fig. 3 is a side elevation of the same as seen from the left hand in Fig. 2. Fig. 4 is a plan view of the same. Fig. 5 is a plan view of the perforating or marking apparatus. Fig. 6 represents the contact mechanism which operates the recording apparatus. Fig. 7 represents the attachment to the clock for closing the electrical circuit at intervals.

My improved electrical indicator consists, essentially, of a suitable battery or other source of electricity, a revolving pointer actuated by a toothed wheel to which a step-by-step movement is imparted by an electro-magnet and a vibrating armature-lever having pawls with inclined faces, and an electric circuit and a suitable device for making or breaking the same.

In the application of my invention to the purposes of a watchman's clock a series of electrical circuits having push-buttons at the various stations which the watchman is required to visit may be employed, a contact-wheel being placed on the pointer-shaft, and suitable contacts arranged so that the pointer moves one step every time one of the push-buttons is operated. A clock-movement may also be employed to send currents through the electro-magnet at stated times, at which the apparatus is in such condition that the watchman cannot operate it, the clock thus serving as a check to the watchman. A recording apparatus may also be employed, which makes a visible mark on a revolving dial at any time when the watchman fails to send in a current from any one of the stations.

Within the case A, which is provided with a locked glazed front, is inclosed the clock-movement L, having the dial B and the electrical indicating apparatus C, having pointer I, dial M, revolving disk or dial K, and a marking apparatus. The clock-movement is of any ordinary or preferred construction. It operates the dial K by any suitable connection, such as the cord N, running over pulleys at each end, so that the dial revolves at the same speed with the hour-hand of the clock. Any other suitable means of operating the dial K from the clock may be employed—such, for instance, as a shaft and bevel-gears.

M is a stationary dial of any suitable graduation, on which the indications of the pointer I are read.

The mechanism C for operating the pointer is inclosed in the case behind the dial M, being shown on an enlarged scale in Fig. 2, in which the electrical connections are indicated the same as they would be when the mechanism is placed inside the case. Thus it will be understood that the wires $a$, $b$, $c$, and $d$, which run into the side of the case in Fig. 1, are the same as the wires which are indicated by the same letters on Fig. 2.

O represents the battery or other source of electricity, and 1 2 3 4 the push-buttons or other devices for opening or closing the electric circuit, which, it will of course be understood, are located at suitable stations in the building or on the premises for the protection of which the watchman is employed.

The indicating apparatus consists, essentially, of a suitable frame D, an electro-magnet Q, (which may be single or double,) a toothed wheel H, a vibrating armature E, provided with the pawls T and S, having inclined faces, the contact-wheel P, and suitable electrical connections which will vary in number according to the number of the stations employed. In the accompanying drawings only four circuits and push-buttons or stations are represented; but it will be understood that a larger or smaller number may be employed.

F is the spindle with which the toothed wheel H, the contact-wheel P, and the pointer I revolves. The spindle revolves in the front cross-bar $r'$ of the frame, its rear end being supported by the cross-bar $s'$, Fig. 4. The teeth $v$ of the wheel H have radial faces on one side, and on the other side the inclined surfaces $z$ $z'$ of the pawls T and S act so as to move the wheel forward in the direction indicated by the arrow in Fig. 2. It will be observed that the pawls T and S are not located exactly opposite each other, but so that the wheel is moved about one-half the space of one tooth by one pawl as it travels inward and the other half by the other pawl, the two pawls by their combined action moving the wheel the distance of one tooth. The pawls are connected together by the lever J, Fig. 3, which is provided with an arm W, pivoted on the screws G, inserted in the frame. The arm W is attached to the shaft X, which extends across the frame and vibrates on the conical ends of the points of the screws G. The movements of the armature and pawls are indicated by the full and dotted lines in Fig. 3. It will be observed that the axis about which the armature and pawls revolve is in the same plane with the axis of the spindle F, and that they vibrate in a plane at right angles with that in which the toothed wheel H revolves, so that the pawls alternately approach and recede from the wheel, so as to impart the step-by-step motion thereto.

In the arrangement shown in the drawings the apparatus is represented as working on an open circuit, the armature E being attracted toward the magnet Q whenever the circuit is closed, the return movement being secured by gravity or the spring U, Fig. 3; but it is obvious that a closed-circuit battery may be employed, if desired.

The contact-wheel P is provided with a rim $g'$, of suitable insulating material, through which the contacts $f$ project, so as to come into contact with the wires $e, a, b, c,$ or $d$, Fig. 2, as the wheel revolves, the rim of the wheel being preferably provided with a groove $j'$, Fig. 2, into which the wires project to prevent lateral displacement. The wires may approach the wheel from either side on the right, as indicated in Fig. 2, or from the left in case they enter the case on that side, as represented in Fig. 1. The wires pass through an insulating-block attached to the frame. (Indicated by the dotted lines $t'$, Fig. 2.)

The course of the circuit through the apparatus on closing any one of the push-buttons—say 1, Fig. 1—is as follows: from the battery O through the wire $k'$, the push-button 1, and the wire $a$ to one of the contacts $f$ on the wheel P, and thence through the frame of the machine and wire $l'$ to the electro-magnet Q, and thence by the wire $i$ back to the other side of the battery. Upon closing the button 1 the armature E is attracted, the pawl S rises and moves the wheel H one-half a space, and when the circuit is broken again the spring U, Fig. 3, pulls the pawl T down and completes the movement of the wheel, the pointer having advanced one space. The contact $f$ is moved beyond the wire $a$ by this motion of the wheel, so that the apparatus is now in condition to receive an impulse from the closing of the next push-button 2 through the wire $b$, and so on until all the buttons have been closed and the contact $f$ has traveled beyond the wire $d$ corresponding to the last station; but the next contact $f$ on the wheel P is not thereby brought into contact with the wire $a$, but only to the wire $e$, so that after having made one round the watchman cannot move the pointer by closing the button 1, but must wait until the clock has moved the pointer one step by making the connection through the wire $e$ and the device represented in Fig. 7.

R is the striker-rod of the clock, which ordinarily strikes the hours and which in the present case is utilized to close the circuit on the spring $o'$, Fig. 7, which is electrically connected with the wire $e$, Fig. 2. The framework of the clock-movement is connected with the battery by the wire $e''$, Fig. 2. The spring $o'$ is insulated from the frame of the clock in any suitable manner. Upon the receipt of an impulse from the clock through the wire $e$ the armature moves and operates the wheel H, advancing the pointer one step and bringing the contact $f$ into position where an impulse may be transmitted through the wire $a$ corresponding to the first station by closing the push-button 1, and so on in succession until at the end of an hour the clock is again called on to move the pointer. It is immaterial whether the striker R makes one or more movements, as only the first contact with the spring $o'$ is effective to work the armature, and consequently the ordinary striking mechanism of a clock-movement may be employed without modification unless desired. The spindle F is provided with a ratchet-wheel $m'$, with the teeth of which a spring or gravity pawl $n'$ engages to prevent a return or backward movement of the pointer. The paper dial K is placed on a sleeve, which is loose on the spindle F, so that they may revolve independently of each other. The pointer I is made removable for this purpose. The wheel $u'$, over which the cord N runs, is attached to the sleeve which carries the paper dial K.

In the operation of my improved electrical indicator when applied to the purpose of a watchman's time-recorder, the paper dial having been placed on the sleeve on the spindle and the apparatus arranged to commence at any given time—say at six o'clock—there being four stations at which the push-buttons 1, 2, 3, and 4 are located, the clock at six o'clock by the striker R, Fig. 7, closes the circuit for a moment through the wire $e$ on the contact $f$, the magnet Q attracts the armature, the inclined pawl S moves the wheel H a part of one space, and pawl T completes the movement by gravity or the spring U. The next operation is the closing of the push-button 1 at one of the stations, which sends a momentary current through the wire $a$ and the contact $f$. The armature moves the wheel H one space, the pointer I moving with it. The watchman next closes the push-button 2, and the current through the wire $b$ moves the wheel and pointer through another space. In a similar way the circuit is closed through the push-buttons 3 and 4 within the hour, and at seven o'clock the clock again closes the circuit through the wire $e$, moving the wheel and pointer one space and putting the apparatus in condition, so that the watchman can as he continues his rounds repeat the operation of closing the circuit at push-buttons 1, 2, 3, and 4 in the proper succession. After the push-button 4 has been operated the closing of the push-button 1 would have no effect on the apparatus unless the clock had in the meantime moved the wheel and pointer a distance corresponding to one of the teeth on the wheel H. The reason for this is that the contact $f$ does not arrive at the position where it touches the wire $a$ until a current has been sent through the wire $e$ by the clock. It is impossible, therefore, for the watchman to indicate more than one round within a given time, and in case he should fail to operate one of the push-buttons at the proper time I provide the arrangement represented in Fig. 6, by which the clock makes a mark on the paper dial K, which shows the watchman's failure to perform his duty.

In Fig. 6, $a'''$ is a disk of insulating material driven by the clock L in any suitable manner and arranged to revolve once in an hour and provided with a metallic rim $b'''$, against which the contact-spring $e'$ bears continuously. $h'$ is a point on the rim $b'''$, which at suitable intervals comes in contact with the springs $v'$, which correspond in number with the stations or push-buttons 1 2 3, &c., and by which contact a current is sent through the coil of the electro-magnet V, which operates the needle or marker $u$ and makes a perforation or other visible mark on the dial K. The apparatus is thus constructed so that the failure of the watchman to send in a current from any given station is recorded on the dial.

The course of the circuit through the apparatus when the clock operates the needle and perforates the dial K will be understood from an examination of Figs. 1 and 2 and is as follows: from the battery O to the magnet Q through the wire $i$, thence by the wire $l'$ to the frame of the indicating apparatus, and thence through one of the contacts $f$ to the wire $a$, thence through $a'$ to insulated point $a''$ to the rim $b'''$, through the contact-spring $e'$ to the wire $p'$, thence through the coil of the magnet V and back to the battery through the wires $q'$ $k'$. It will thus be seen that the clock moves the pointer and marks the dial at any time that the watchman may fail to operate one of the buttons; but the dial is not marked unless such failure occurs. The result of this arrangement is that with a watchman who is regular in the performance of his duties the dial K will rarely require changing—a point of advantage over those instruments in which the dial must be changed daily.

It will be understood that my apparatus with a single electric circuit and closing device and without the clock or revolving dial can be applied to the purposes of recording the number of passages in any conveyance, to registering the number of tickets collected, or indicating the number of articles made by a machine, or to many other purposes which will readily occur to the skilled constructor.

It is obvious that the wheel P may be provided with two or more grooves in case a larger number of the contacts $f$ be used.

I claim—

1. The combination, with the toothed wheel H, provided with the pointer I, of the electromagnet Q and the pivoted lever J, having the pawls T and S, located on opposite sides of the wheel and provided with the armature E, attached to the lever between its pivot and one of the pawls, the said lever being arranged to vibrate in a plane at right angles with the plane in which the wheel revolves, substantially as described.

2. The combination, with the toothed wheel H, carrying the pointer I, and the contact-wheel P, of the electro-magnet Q, the vibrating-lever J, having pawls T and S, and one or more electric circuits $a$, having circuit-closing device 1, substantially as described.

3. The combination, with the toothed wheel H, carrying the pointer I, and the contact-wheel P, of the electro-magnet Q, the vibrating lever J, having pawls T and S, the revolving dial K, clock mechanism L, arranged to revolve the dial K, and electrical mechanism operated by the clock and adapted to make a visible mark on the dial at predetermined intervals, substantially as described.

4. The combination, with the toothed wheel H, carrying the pointer I, and the contact-wheel P, of the electro-magnet Q, the vibrating lever J, having pawls T and S, one or more electric circuits $a$, having circuit-closing device 1, and a revolving dial operated by clockwork, and electrical mechanism operated by the clock and adapted to make a visible mark on the dial, substantially as described.

5. The combination, with the clock-movement L, of the electrically-operated pointer I, the dial M, and the revolving dial K, operated from the clock-movement by a suitable connection, as N, substantially as described.

6. The combination, with the clock-movement L, of the electrically-operated pointer I, the dial M, the revolving dial K, operated from the clock-movement by a suitable connection, as N, and suitable electrical mechanism operated by the clock and adapted to make a visible mark on the dial, substantially as described.

7. The combination, with the revolving pointer I, arranged to be operated by the making or breaking of an electric circuit or circuits, of the clock-movement L, the revolving dial K, actuated by the clock-movement, and suitable electrical mechanism adapted to make visible marks on the dial at predetermined intervals at times when the pointer-circuit is inoperative, substantially as described.

8. The combination, with the revolving pointer I, of the toothed wheel H, contact-wheel P, dial K, electro-magnet Q, lever J, having pawls T and S, clock L, arranged to actuate the dial, the needle $u$, electro-magnet V, and suitable mechanism for closing the electric circuit operated by the clock, substantially as described.

NELSON H. RAYMOND.

Witnesses:
CHAS. M. PROCTOR,
GEO. B. SELDEN.